Dec. 31, 1968   J. H. WORTHEN   3,418,720
BORE GAGE WITH SHOCK ABSORBING MOTION TRANSMITTING MEANS
Filed Feb. 17, 1967
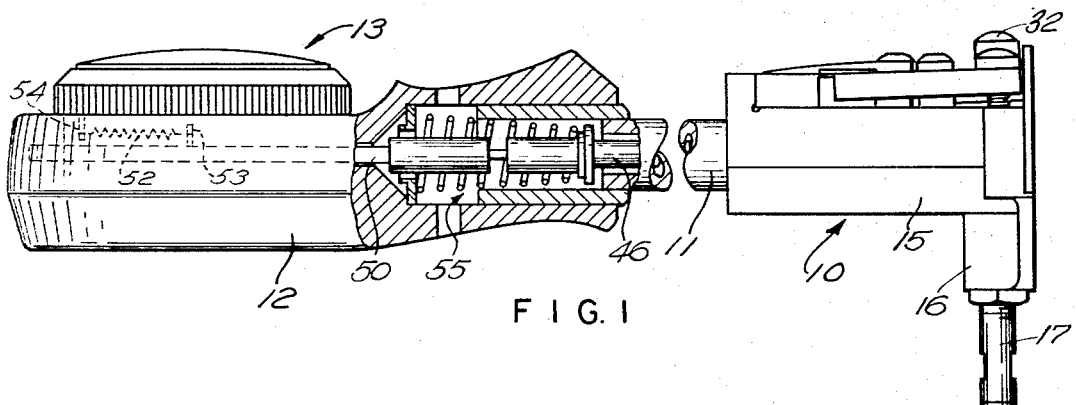
FIG. 1
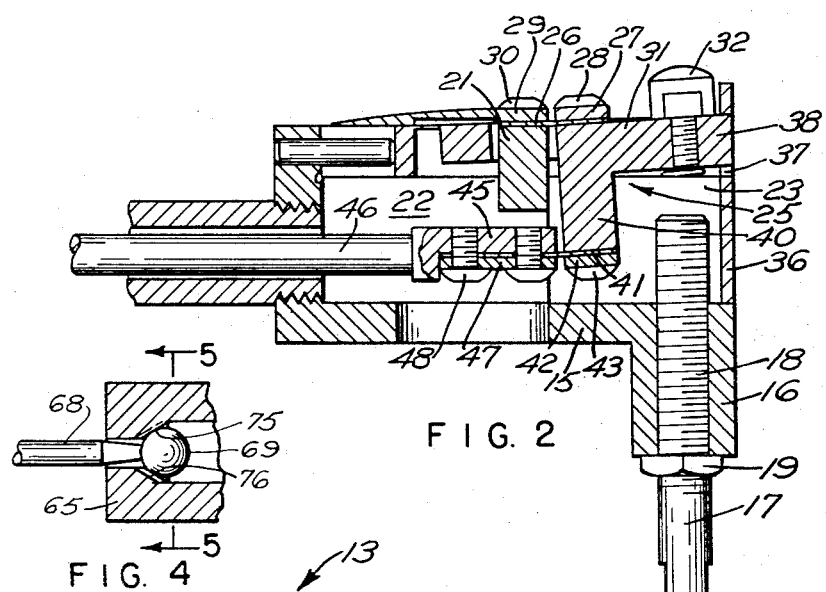
FIG. 2
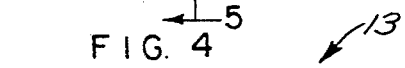
FIG. 4
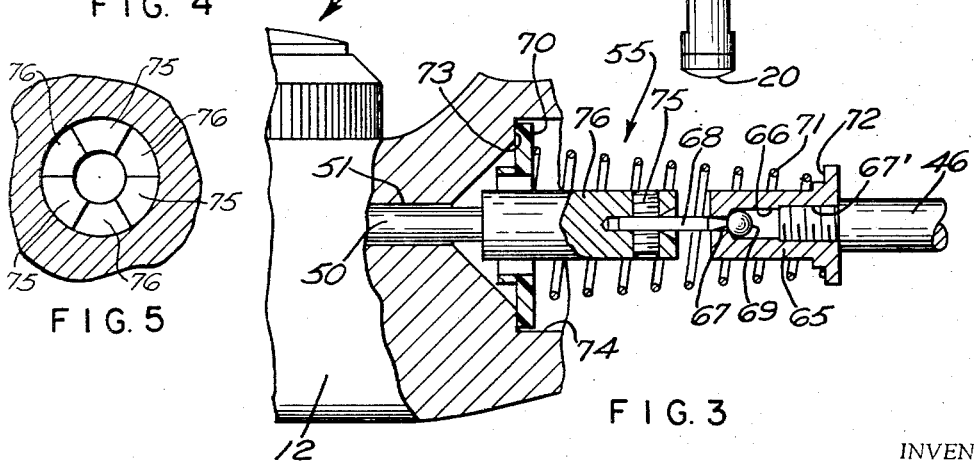
FIG. 5
FIG. 3
INVENTOR.
JOHN H. WORTHEN
BY
Barlow & Barlow
ATTORNEYS United States Patent Office 3,418,720
Patented Dec. 31, 1968

3,418,720
BORE GAGE WITH SHOCK ABSORBING
MOTION TRANSMITTING MEANS
John H. Worthen, Providence, R.I., assignor to Federal
Products Corporation, a corporation of Rhode Island
Filed Feb. 17, 1967, Ser. No. 616,838
4 Claims. (Cl. 33—147)

ABSTRACT OF THE DISCLOSURE

A shock absorber transmitting means located between a dial indicator and a work engaging measuring head of a bore edge.

Background of the invention

Measuring systems usualy have a measuring contact engaging the work with some solid or rigid transmitting means from the contact to a dial indicator, and should there be abusive treatment or sudden shock occur at the measuring contact, the transmission of this shock to the dial indicator may injure some of the operating parts.

Summary of the invention

The transmission between the gaging head and the dial indicator has a shock absorbing means comprising two relatively axially movable members which telescope one within the other and are limited in their movement away from each other, a shock spring urging the members away from each other and against this limit. A sudden impact exerted on the transmission rod will cause the spring to give and permit the members to axially telescope and then the members will assume their axial position one relative to the other under the influence of the indicator mechanism return spring located within the indicator housing. Thus any shock which may impinge against the contact member is absorbed by the spring.

Brief description of the drawings

FIG. 1 is a side elevation of the device with a portion of the connection between the gaging head and the dial indicator broken away to show the shock absorbing means;

FIG. 2 is a sectional view of the gaging head showing the measuring contact and its connection to the transmission rod;

FIG. 3 is a larger section absorbing means;

FIG. 4 is a fragmental enlarged sectional view of the coupling pin end; and

FIG. 5 is a sectional view on lines 5—5 of FIG. 4 with the end of the pin removed.

Description of the preferred embodiment of the invention

In FIG. 1, 10 designates the gaging head connected by a handle 11 to a body 12 containing a dial indicator designated generally 13 which is set into this body. Means are provided within this tubular handle member 11 for transmitting motion from the gaging head 10 to the indicator 13 as will be more fully described.

The gaging head 10 has a body portion 15 that may project downwardly as at 16 and contains a fixed work contact 17 adjustably held in the part 16 by means of threads 18 and a lock nut 19. The end 20 serves as a contact point for the work bore to be measured. Integral with the body is a solidly fixed post 21 which divides hollowed-out portions 22 and 23 of the body. This solid post 21 serves as a mounting means for a bell crank coupling linkage 25 having a leaf spring reed 26 clamped by means of a block 27 and screws 28 to the upper surface of the bell crank member 25, while a cover plate 29 serves to clamp the leaf spring reed 26 to the solid post 21 by means of screws 30. This bell crank linkage has a horizontally extending arm 31 which carries a work contact 32 for engaging the work to be measured. Contact 32 is in the same plane with the fixed contact 20, and both are located generally centrally laterally of the body 15 and gage head 10. The cover 29 extends rearwardly to cover the working parts of the device.

A plate 36 on the end of the body has an opening 37 therein to receive the end portion 38 of the horizontal arm 31 of the bell crank linkage, so that the edges of opening 37 serve as limits of the movement of this linkage as it swings about the hinge reed 26 as a pivot. The bell crank linkage 25 also has a downwardly extending leg 40 which has a leaf spring reed 41 clamped thereto by means of block 42 and screws 43, this leaf spring being clamped to the end portion 45 of the transmission rod 46 by means of a block 47 and screws 48.

The dial indicator 30 may be of any type but generally consists of a gear train actuated by a rod 50 which extends centrally through the dial indicator housing and thence outwardly through an opening 51 in the body 12 of the device. A spring 52 engaging a pin 53 which is fixed to the rod 50, and an anchor 54 which is fixed to the casing at all times tend to move the rod to the left as viewed in FIGS. 1 and 3. The rods 46 and 50 are connected together through a shock absorbing means designated generally 55 which is interposed between them but which serves as a means for transmitting motion from one to the other.

As seen in FIG. 3, the shock absorbing means 55 comprises a sleeve 65 having a bore 66 threaded along its outer end as at 67' which is screwed onto the rod 46. A smaller bore 67 extends axially from the other end of bore 66 and receives a pin 68 coupled to the end of rod 50 by a block 76 which is secured to the rod 50 and which receives and holds pin 68 by a set screw 75. This pin 68 has an enlarged end 69 of a size so that the pin 68 cannot be pulled outwardly axially through the restricted opening 67 in the sleeve 65. A spring 71 acting between the flange 72 on the sleeve 65 and a washer 70 against the end wall 73 of the recess 74 of the body serves to move the sleeve member and pin member 68 away from each other until the enlargement 69 contacts the shoulder formed between the bores 67 and 66. To insure repetition of contact point, the shoulder is preferably formed as shown in FIG. 5. Here it will be seen that the shoulder is provided with three raised contact areas 75 which are defined by the depressed areas 76. In this fashion any irregularities that may exist in the spherical end 69 will not affect the linear position of rods 50 and 46.

From the description of the shock absorbing means it will be apparent that if the contact 32 receives a sudden impact swinging the contact inwardly quickly, the thrust through the reed 41 toward the rod 46 will cause the sleeve to slide along the pin 68 compressing the spring 71 and absorbing the shock rather than transmitting it directly to the indicator rod 50, thus serving as a shock absorber for the movable parts of the gage head and also for the indicator 13 and protecting both. It will further be recognized that upon a shock being imparted to the contact 32, the inertia of the dial indicator, block 76 and pin 68 is sufficient so that it will not follow movement of rod 46 and thus the enlarged end 69 leaves its seat in the sleeve 65, returning as soon as the spring 52 in the indicator can act.

I claim:

1. In a bore gage, a gaging head, a dial indicator, movement transmission means from said head to said indicator comprising two parts coupled together through a shock absorbing connector comprising a pair of members relatively axially movable, means on said members to limit axial movement away from each other and a spring urging said members toward said limiting means, said means comprising a sleeve and a pin with an enlarged end axially extending into said sleeve, said end having an arcuate surface and said sleeve having a discontinuous surface for contact therewith, said discontinuous surface defined by alternately arranged raised contact surface areas and depressed areas.

2. In a bore gage, a gaging head, a dial indicator, movement transmission means from said head to said indicator comprising two parts coupled together through a shock absorbing connector comprising a pair of members relatively axially movable, means on said members to limit axial movement away from each other and a spring urging said members toward said limiting means, said means comprising a sleeve with a restricted end opening and a pin axially extending into said opening with an enlarged end to prevent its withdrawal therefrom, said end having an arcuate surface and said sleeve having a discontinuous surface for contact therewith, said discontinuous surface defined by alternately ararnged raised contact surface areas and depressed areas.

3. In a bore gage, a gaging head comprising a bell crank carrying gaging contacts, a leaf spring mounting said bell crank, a dial indicator, a motion transmitting means from said bell crank to said indicator comprising a rod, a leaf spring connecting said rod to said bell crank to support one end of the rod, a sleeve fixed to the other end of said rod having a restricted opening in the end thereof, a pin axially movable through said opening into said sleeve and having an enlarged end to prevent withdrawal through said opening whereby the other end of the rod is supported, and a spring for urging said pin and sleeve in opposite directions.

4. In a bore gage as in claim 3 wherein said enlarged end having an arcuate surface and said sleeve having a discontinuous surface for contact therewith, said discontinuous surface defined by alternately arranged raised contact surface areas and depressed areas.

References Cited

UNITED STATES PATENTS 2,099,930  11/1937  Emery.
2,253,803   8/1941  Newberry.

FOREIGN PATENTS 889,696   9/1953  Germany.

HARRY N. HAROIAN, *Primary Examiner.*

U.S. Cl. X.R.

33—148, 178